UNITED STATES PATENT OFFICE.

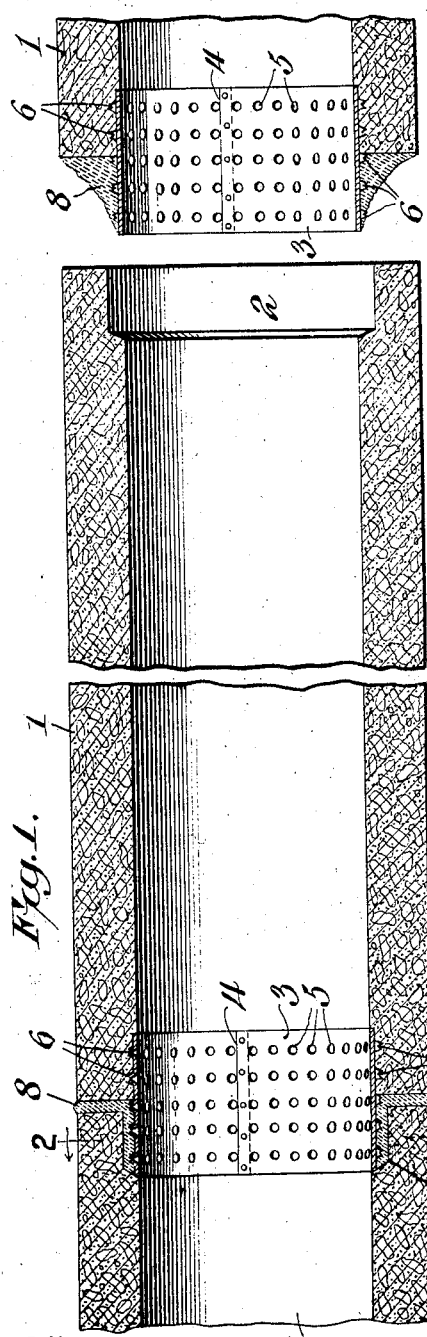
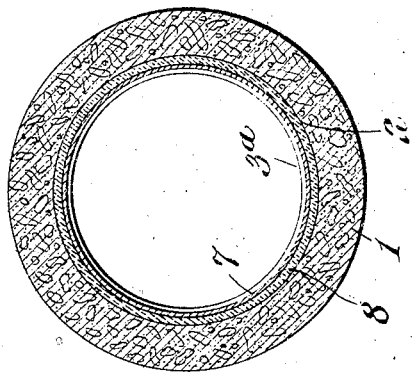
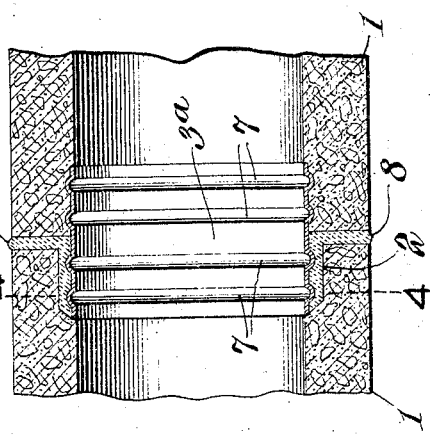
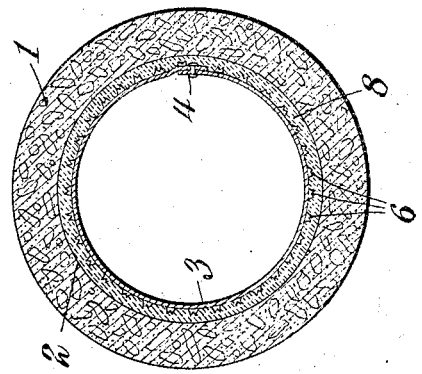
F. N. CRONHOLM.
PIPE JOINT.
APPLICATION FILED MAY 8, 1911.
1,048,045.
Patented Dec. 24, 1912.
Frederick N. Cronholm, Inventor,

FREDERICK N. CRONHOLM, OF SUNNYSIDE, WASHINGTON.

PIPE-JOINT.

1,048,045.  Specification of Letters Patent.  Patented Dec. 24, 1912.

Application filed May 8, 1911. Serial No. 625,683.

*To all whom it may concern:*

Be it known that I, FREDERICK N. CRONHOLM, a citizen of the United States, residing at Sunnyside, in the county of Yakima and State of Washington, have invented a new and useful Pipe-Joint, of which the following is a specification.

This invention has reference to improvements in pipe joints and more particularly with reference to concrete pipes, and its object is to provide a means whereby lengths of concrete pipes may be joined end to end without requiring interior refinishing and, moreover, providing means whereby the joint is made stronger than joints as usually constructed.

The present invention is particularly useful in connection with pipes of diameters which will not permit the entrance of a workman for the purpose of smoothing the joints, this being necessary in conduits made of concrete pipe sections united by cement mixtures in the ordinary method of laying concrete conduits, since the cement mixture used for uniting the ends of the pipes is liable to flow into the interior of the pipe, thereby making such portion of the pipe of irregular diameter, and to such extent interfering with the flow of material through the pipe.

In accordance with the present invention the pipe sections are made of the same external diameter throughout as is customary in the manufacture of concrete pipes and one end of each pipe is made of greater internal diameter for a distance by the introduction of a suitable form in the mold, while the other end of the pipe carries an internal ring firmly embedded in the corresponding end of the pipe and projecting therefrom axially for a sufficient distance to cover the portion of larger diameter in the end of the mating pipe section, the ring constituting an internal dam which will hold the cementing mixture introduced between the abutting ends of the pipes and by making the ring of suitable form it is anchored not only to the end of the section initially carrying it, but to the end of the section into which it is introduced.

The invention will be best understood from a consideration of the following detailed description taken in connection with the accompanying drawings, with the understanding, however, that while the drawings show different practical embodiments of the invention, these are to be taken as merely typical of other practical embodiments of the invention, since the latter is susceptible of various changes and modifications without departure from the scope of the invention.

In the drawings:—Figure 1 is an axial diametric section of a concrete pipe made up of sections, two sections being shown in joined relation and another section in position to be joined to a section. Fig. 2 is a cross section on the line 2—2 of Fig. 1. Fig. 3 is an axial section through a form of joint differing somewhat from that shown in Fig. 1. Fig. 4 is a section on the line 4—4 of Fig. 3.

Referring to the drawings, there are shown pipe sections 1 made of concrete, which sections may be formed in a suitable mold, and each section is provided at one end with an internal annular recess 2 which, because of this recess, may be termed the bell end, although the external diameter of the pipe is not enlarged at this point, and the bell end is not designed to receive the corresponding end of another pipe section, since in accordance with the present invention the pipe sections are brought into close end to end relation, but with a small space between the ends which is finally filled with a cementing mixture of suitable richness. The end of the pipe remote from the bell end carries a ring 3 in the structure shown in Figs. 1 and 2, or 3ª in the structure shown in Figs. 3 and 4, the rings differing in certain details, but not in general form or purpose. The ring 3 or 3ª is molded into the corresponding end of the pipe 1 when the latter is formed, the ring being introduced into the mold before the concrete mixture is placed therein, and when the concrete mixture has set the ring is embedded therein with the inner face of the ring flush with the inner face of the pipe, so as to present no impediment to the passage of material through the pipe since the diameter of the latter is not in any manner reduced by the presence of the ring. Such ring or band is made of any suitable non-corrosive metal and projects axially from the corresponding end of the concrete pipe section to an extent equal or about equal to the axial depth of the groove 2 in the end of a mating section. Usually the ring or band is embedded to half its length in the pipe carrying it.

In Figs. 1 and 2 the band is indicated as a piece of sheet metal bent into cylindrical shape with the ends overlapping and riveted together, the joint being shown at 4, but such band may be an endless band, as indicated in Figs. 3 and 4, that is, a band without a riveted or like joint. In Figs. 1 and 2 the band 3 is shown as provided with numerous indentations 5 which may be made by a suitable tool or tools punching through the band from the inner wall outwardly either before or after the band is completed, and these punchings are so formed as not to remove any of the metal, but simply produce outwardly directed burs 6, the purpose of these burs being to embed in the concrete or cement mixtures to anchor the band against movement with relation to such materials.

In Figs. 3 and 4 the band is formed with circumferential grooves on the inner face forming like beads 7 on the outer face, which face is the one contacting with the pipe or cementing material. In either case the inner wall of the band is without material projection to enter into the interior of the finished pipe, and so obstruct the flow of material therethrough. The ends of the pipe sections have their end faces in planes perpendicular to the longitudinal axis of the pipe, so that when the ends of the pipe are brought into contiguity, these faces will be in substantial parallelism one with the other, although not contacting since it is desirable that a thin layer of cementing material be confined between the adjacent ends of the pipe to unite them and prevent leakage through the joints. When the adjacent ends of the pipes are brought into the desired close relation, the free ends of the bands 3 or 3ª, as the case may be, enter the bell ends of the adjoining pipes to an extent substantially that of the axial length of the groove 2, so that there is formed in the bell end of each pipe an annular chamber between the outer wall of the projecting end of the band and the inner wall of the pipe where there is formed the groove 2. The projecting ends of the bands are sufficiently longer than the axial depth of the grooves 2 to provide for the thin circumferential space between the contiguous ends of the pipe sections when the free ends of the bands abut against the inner end walls of the grooves. To unite the adjoining ends of contiguous pipe sections a suitable quantity of cementing material 8 is first applied to the projecting portion of the band 3 of one of the pipe sections. This cementing material is usually formed of a mixture rich in cement and may be so prepared as to be sufficiently cohesive to cause it to retain its place upon the band 3 in a manner somewhat as illustrated at the right hand end of Fig. 1. The pipe section end containing the band 3 and cement 8 applied thereto is now introduced into the recess 2 of the adjacent pipe section until the free end of the band 3 is approximately or quite at the inner end of the recess. Since the cement mixture is still somewhat soft it will readily conform to the space between the band 3 and the walls of the recess 2 and fill such space, some of the material finding its way into the space between the contiguous ends of the two sections being united. The band 3 or 3ª, however, prevents flow of this cementing mixture into the interior of the pipe, even though the perforations 5 be present, since these latter are too constricted to permit any material flow of the cementing mixture therethrough. When the free end of the band has entered the bell end of the next section to the full extent, the chamber defined by the groove 2 and the corresponding band becomes filled with the soft material and the space between the contiguous ends of the pipe sections also becomes filled with this material which may be stiff enough to hold its place, but still sufficiently soft to flow to an extent permitting the filling of the space between the pipes, and when this material hardens the band is anchored both to the pipe originally carrying it and the adjoining pipe into which it is introduced, while the cementing material also serves to unite the mating ends of the pipe sections. The interior of the pipe when the sections are joined is without constriction at the joints, since the bands have the same internal diameter as the pipe, and consequently the walls of the pipe are flush throughout.

The bands may be made of galvanized iron or steel or be otherwise protected against corrosion and avoid the necessity of wiping the inside of the pipe at the joints, while thorough inspection of the joints is permitted and no collar is necessary. Furthermore, the pipes may be brought into such close relation end to end as to make the pipe line practically monolithic. Since a rich mixture of the ingredients, richer than used in the body of the pipe sections, is employed in the joint, the joints are as strong as the remainder of the pipe. Since the joint structure of the present invention may be readily and thoroughly inspected it is an easy matter to ascertain whether the joints are satisfactory, for it is easily ascertained whether the joints are as strong as other parts of the pipe, and this is the criterion for the passing on the job as satisfactory.

In joining small pipes difficulty has heretofore been encountered in endeavoring to apply the mortar to the end of the pipe, because some of the mortar would almost invariably fall off, and it is always difficult to ascertain whether or not the mortar really stayed in the joint or any part fell into the pipe. The holding means on the exterior of the projecting end of the band, especially where the band is of the perforated type, is effective in preventing any of the cementing material or mortar from falling off, even should the pipe be turned upside down, and, moreover, the pipe sections may be brought into closer relation than heretofore, thus requiring a smaller amount of cementing material. Some of this material will usually ooze out forming a bead on the outer surface of the pipe, which may afterward be rubbed off, leaving the joint complete and the pipe of a uniform thickness at the joint.

It is customary in making concrete structures to employ reinforcing means, and it will be understood that such reinforcing means are used in connection with concrete pipe sections, but since such means are in common use and form no part of the present invention it has not been deemed necessary to illustrate them in the drawing.

What is claimed is:—

1. A concrete pipe section having at one end a metallic band embedded in the inner wall thereof with its inner surface flush with said wall and projecting from the end of the pipe section, and the other end of said pipe section being provided with a groove or channel in its inner wall of less axial length than and adapted to receive the projecting portion of a band of a successive pipe section, the outer diameter of the metallic band at one end of the pipe section being less than the inner diameter of the groove or channel at the other end of the pipe section.

2. A concrete pipe section having at one end an interior entering groove or channel and at the other end provided with a metallic band with anchoring means extending outwardly from its outer wall, the external diameter of the band and its anchoring means being less than the internal diameter of the groove or channel at the other end of the pipe section, and said metallic band being at one end embedded in the inner wall of the corresponding end of the pipe section with its inner surface flush with the said inner wall and its other end projecting beyond the end of the pipe section carrying it, the extent of axial projection of the metallic band being greater than the axial extent of the entering groove or channel at the other end of the pipe section.

3. A concrete pipe section having at one end a metallic band embedded in the inner wall thereof flush with said wall and projecting from the end of the pipe and there provided with exterior anchoring means, and the other end of the pipe being provided with a groove or channel in its inner wall adapted to receive the projecting portion of a band of a successive pipe section in substantially concentric spaced relation to the walls of said groove, the projecting end of the band being of a length to enter the groove of the successive pipe section to the full axial length of said groove.

In testimony, that I claim the foregoing as my own, I have hereto affixed my signature in the presence of two witnesses.

FREDERICK N. CRONHOLM.

Witnesses:
 JOHN J. BUCK,
 D. STEYER.